Jan. 25, 1927.

F. C. C. VOGEL 1,615,248

WEIGHING APPARATUS

Filed Feb. 5, 1925

Inventor
F.C.C.Vogel
by
Langner, Parry,
Card & Langner
Att'ys.

Jan. 25, 1927.  F. C. C. VOGEL  1,615,248
WEIGHING APPARATUS
Filed Feb. 5, 1925  2 Sheets-Sheet 2

Inventor
F.C.C.Vogel
by Langner, Parry, Card & Langner
Attys.

Patented Jan. 25, 1927.

1,615,248

UNITED STATES PATENT OFFICE.

FREDERIK CARL CHRISTIAN VOGEL, OF HAMBURG, GERMANY, ASSIGNOR TO THE FIRM VOGEL & HALKE, OF HAMBURG, GERMANY.

WEIGHING APPARATUS.

Application filed February 5, 1925, Serial No. 7,172, and in Germany October 24, 1924.

The present invention relates to a weighing apparatus and more particularly to weighing apparatus of the kind in which the indicator is operated by an intermediate driving mechanism that is only put into operation at the proper time by a manually operated trip gear, thus preventing the indicating mechanism from being strained by the action of the load, which would result, even after a short period, in material wear and tear and consequently inaccurate weighings.

A weighing apparatus of this kind has been shown and described in my U. S. Patent 1,553,651 which comprises an indicating mechanism that is normally locked and when tripped is operated by the said intermediate driving mechanism. In this said weighing apparatus the indicating mechanism is provided with an oscillatory lever, which operates the indicating member and is locked in zero position by a bolt. Moreover the oscillatory lever is connected with the connecting rod operated upon by the platform of the scale by the intermediary of a yielding spring, which upon the apparatus being loaded and the oscillatory lever being unlocked, rocks the latter until supported by the connecting rod adjusted by the load.

For holding the lever in position, a slidable bolt is provided which, by a hand lever and by the aid of an intermediate bell crank lever, can be retracted to release the oscillatory lever, which bolt thereupon is held in released position of the lever by a latch. This device is somewhat inconvenient and particularly since the slidable bolt and the bell crank lever engaging the bolt is subject to friction and jamming.

To avoid these drawbacks and moreover to simplify the apparatus, according to the present invention a locking lever is employed in place of the locking bolt described in my said patent. This locking lever is provided with a tooth adapted to enter a notch in a locking disk firmly mounted on the spindle of the index pointer, thus indirectly locking the oscillatory lever and at the same time holding the index pointer in zero position.

In the drawings—

Figure 1:
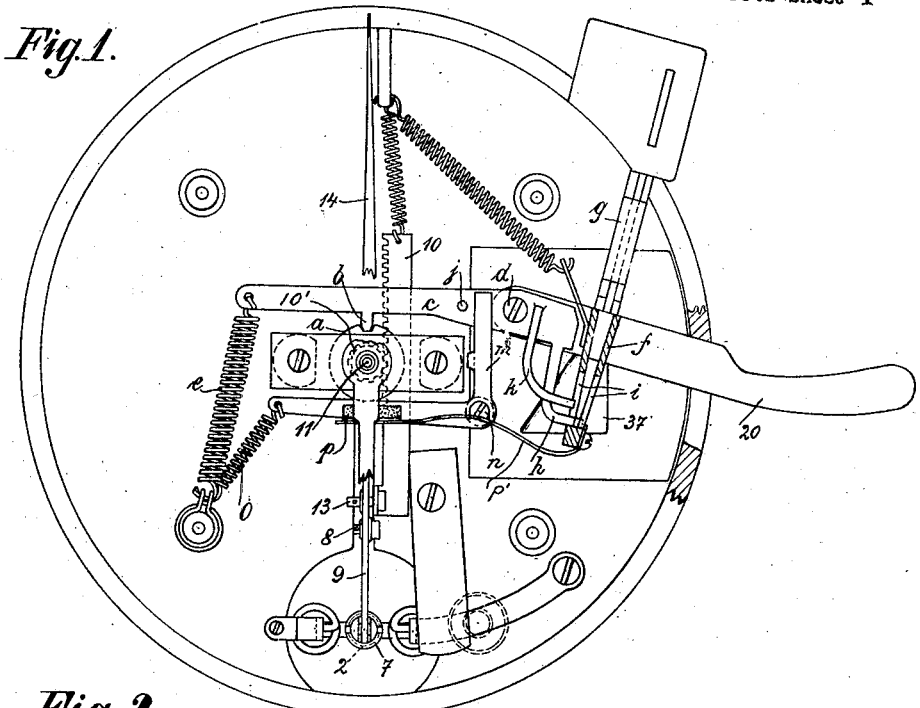
Fig. 1 is a plan of the upper part of the weighing apparatus including the indicating mechanism, the cover being removed and the other parts being broken away.
Figure 2:
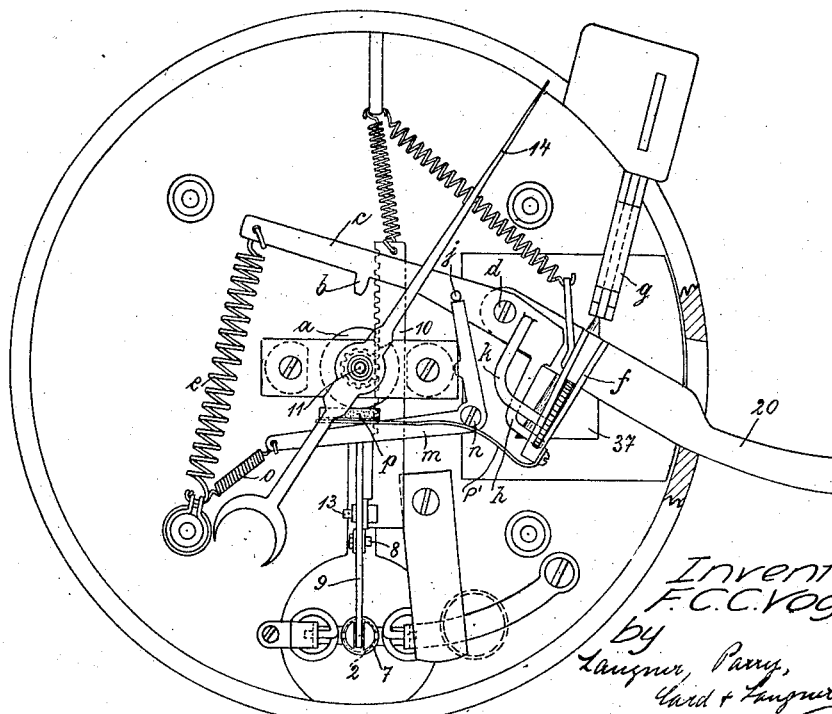
Fig. 2 is a similar plan showing the parts in the position assumed when the apparatus is loaded by a person and the hand-lever is operated.
Figure 3:
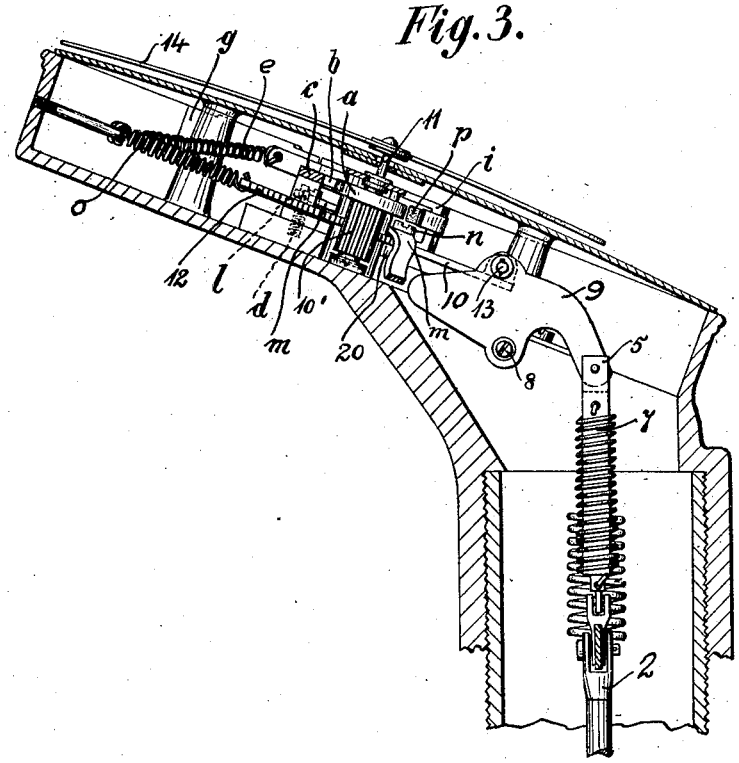
Fig. 3 is a vertical sectional view through the upper part of the weighing apparatus.

Similar to the construction shown in my said patent a lever 9 is pivoted on a pin 8 and connected by the aid of a spring 7 with a connecting rod 2 engaged by a platform. A stud 13 serves to connect the lever 9 with a rack 10 engaging a pinion 10' on a dial spindle 11.

A locking disk $a$ firmly attached to the dial spindle 11 is provided with a notch on its rim, a tooth $b$ on a two-armed locking lever $c$ engaging this notch in the zero position of the index pointer 14. The locking lever $c$ is pivoted to a bolt $d$ and is normally drawn towards the locking disk $a$ by a spring $e$. On the tooth $b$ engaging the notch in the disk $a$ the lever 9 is locked in position. To the bolt $d$ is also pivotally connected the manually operable lever 20, which is provided with a pocket $f$ opening out with its lower end above the coin slot 37 and its mouth coinciding with the coin chute $g$ having the usual insertion slot. The coin within the pocket $f$ will be held on one side by the edge of the hand lever 20 and on the other side by the cranked arm $h$ of the locking lever $c$. The arm $h$ can preferably be made adjustable with respect to its distance from the hand lever 20 to allow for variations in the diameter of the coin. The walls of the pocket $f$ are provided with slots $i$.

Another cranked arm $k$ is attached to the locking lever $c$, the end of this arm being adapted to engage the slots $i$ of the inner wall of the pocket. The long arm of the locking lever $c$ has a pin $j$ against which the end of one of the arms of a bell crank lever $m$ bears. This arm of the lever $m$ is attached to the bolt $n$ while the other arm is attached to a spring $o$. The bell crank lever $m$ is held in this position with respect to the pin $j$ by the lever 9 in the same manner as the latch mentioned in the said patent.

A flat rubber brake block $p$ is connected to the pocket $f$ by a spring arm $p^1$ and is adapted to bear against the locking disk $a$ as soon as the hand lever 20 is operated.

The operation of this form of weighing apparatus is as follows.—When the platform is weighted by a person standing thereon, the lever 9 cannot follow the movement of the connecting rod, since it is held back by the tooth $b$ of the locking lever $c$ engaging the locking disk $a$. When the person weighing himself moves the hand lever 20, after having previously inserted a coin into the coin chute $g$, the brake block $p$ is pressed against the locking disk $a$ and by the intermediary of the coin within the pocket $f$ a movement of the locking lever $c$ is caused by the coin striking against the arm $k$. The tooth $b$ will thereupon release the locking disk $a$ and while the hand lever 20 is rotated, the brake block $p$ rotates the locking disk $a$ by rolling or rocking thereon, owing to which movement the lever 9 is also rocked to a certain extent. The bell crank lever $m$ is thus released and is now moved into such a position by the spring $o$ that its vertical arm is moved under the pin $j$ and holds it. If now the hand lever 20 is released the locking lever $c$ is held in a locked position by the bell crank lever $m$ and the brake block $p$ moves away from the locking disk $a$. The coin being now unsupported falls down through the guide slot 37 and the lever 9 is caused to rock by the spring 7 connected with the rod 2, until it is supported by this rod in the position in which the latter was moved by the load. During this period the lever 9 has rotated the index pointer 14 by means of the rack 10 to a number on the scale corresponding to the weight of the person or load.

When the person steps off the platform the bell crank lever $m$ will be rotated rearwardly by the lever 9 to such an extent, that its vertical arm is drawn from underneath the pin $j$ to one side thereof and the locking lever $c$ is thereby released and its tooth $b$ engages the notch in the locking disk $a$ which in the meantime is rotated into the zero position. The use of the brake block $p$ is not an absolute necessity but it has the advantage of overcoming the resistance caused by friction when the tooth $b$ is released from the notch in the locking disk $a$.

I claim:—

1. In a weighing apparatus, in combination, an indicator comprising a pointer, a spindle carrying the pointer, an oscillatory normally locked lever arranged to operate the index pointer on being released, a locking disk fixed to the spindle, a locking lever normally engaging the disk in locking position, a hand lever manually operable to rotate the locking lever into the released position, means on the locking lever and on the hand lever for supporting a coin, and means on the locking lever for engaging the coin to rotate said lever into released position.

2. In a weighing apparatus, in combination, an indicator comprising a pointer, a spindle carrying the pointer, an oscillatory normally locked lever arranged to operate the index pointer on being released, a locking disk fixed to the spindle, a locking lever normally engaging the disk in locking position, a hand lever manually operable to rotate the locking lever into the released position, means on the locking lever and on the hand lever for supporting a coin, means on the locking lever for engaging the coin to rotate said lever into released position, a bell crank lever normally engaged by the oscillatory lever, a spring tending to rock the bell crank lever and biasing it in engagement with the oscillatory lever, and a pin on the locking lever arranged to be engaged by the bell crank lever, when the latter is rocked by the spring and the locking lever has released the locking disk.

3. A weighing apparatus according to claim 1, a pocket mounted on the hand lever, means spring-pressing the hand lever to one side, an arm on the locking lever projecting under the pocket and constituting in conjunction with the edge of the hand lever, a holder for a coin when inserted into the pocket, a slot in the wall of the pocket, a second arm on the locking lever arranged to enter the pocket by the slot and to be engaged by the coin when the hand lever is operated, whereby the locking lever is rocked to release the locking disk, and means to hold the locking lever when thus oscillated upon the hand lever being allowed to return into its normal position and thus moving away from the first named arm of the locking lever so that the coin is permitted to drop, and means on the first named oscillatory lever for operating the holding means for the locking lever so as to release the same.

4. In a weighing apparatus the combination of an indicator comprising a pointer and a spindle carrying the pointer with an oscillatory normally locked lever adapted to operate the index pointer on being released, a locking disk fixed to the said spindle, a locking lever normally engaging the said disk in locking position, a hand lever normally operable to rotate the locking lever into the released position, means on the locking lever and on the hand lever for supporting a coin, means on the locking lever for engaging the coin to rotate said lever into released position, a springy arm connected with a hand lever, and a friction block attached to the end of said springy arm and adapted to operatively engage and rotate the locking lever on the hand lever being actuated.

FREDERIK CARL CHRISTIAN VOGEL.